United States Patent

[11] 3,603,092

[72] Inventors T. O. Paine
Administrator of the National Aeronautics and Space Administration with respect to an invention of;
Martin G. Drexhage
[21] Appl. No. 860,635
[22] Filed Sept. 24, 1969
[45] Patented Sept. 7, 1971

[54] INJECTION HEAD FOR DELIVERING LIQUID FUEL AND OXIDIZERS
4 Claims, 10 Drawing Figs.
[52] U.S. Cl. ..................................................... 60/258, 60/39.74
[51] Int. Cl. ..................................................... F02k 9/02
[50] Field of Search ............................................ 60/258, 39.74, 211

[56] References Cited
UNITED STATES PATENTS
3,001,365 9/1961 Kellogg ......................... 60/258
3,446,024 5/1969 Lewis ............................ 60/39.74
3,122,885 3/1964 Heidmann ..................... 60/258
3,439,502 4/1969 Lee ............................... 60/258

*Primary Examiner*—Douglas Hart
*Attorneys*—G. T. McCoy, J. H. Warden and Monte F. Mott ABSTRACT: An injection head for delivering liquid fuel and oxidizers to the thrust chamber of a reaction engine, characterized by a plurality of circumferentially arranged sets of radially aligned inner and outer fuel injection orifices, each set having an oxidizer injection orifice radially aligned therebetween, with each orifice of each set of orifices being adapted to deliver a stream intersecting the streams delivered by the other orifices of the set in a manner such that the velocity of the streams of fuel delivered from the inner and outer fuel injection orifices is sufficient to cause a portion of the stream delivered from the oxidizer injection orifice to be mixed with the stream delivered from the outer orifice and to be deflected along the wall of the thrust chamber so as there to establish a fuel-rich, cooler-burning region, while elsewhere achieving optimized mixing, whereby the temperature within the regions adjacent to the wall of the thrust chamber is maintained at an operative level substantially below that experienced elsewhere in the thrust chamber.

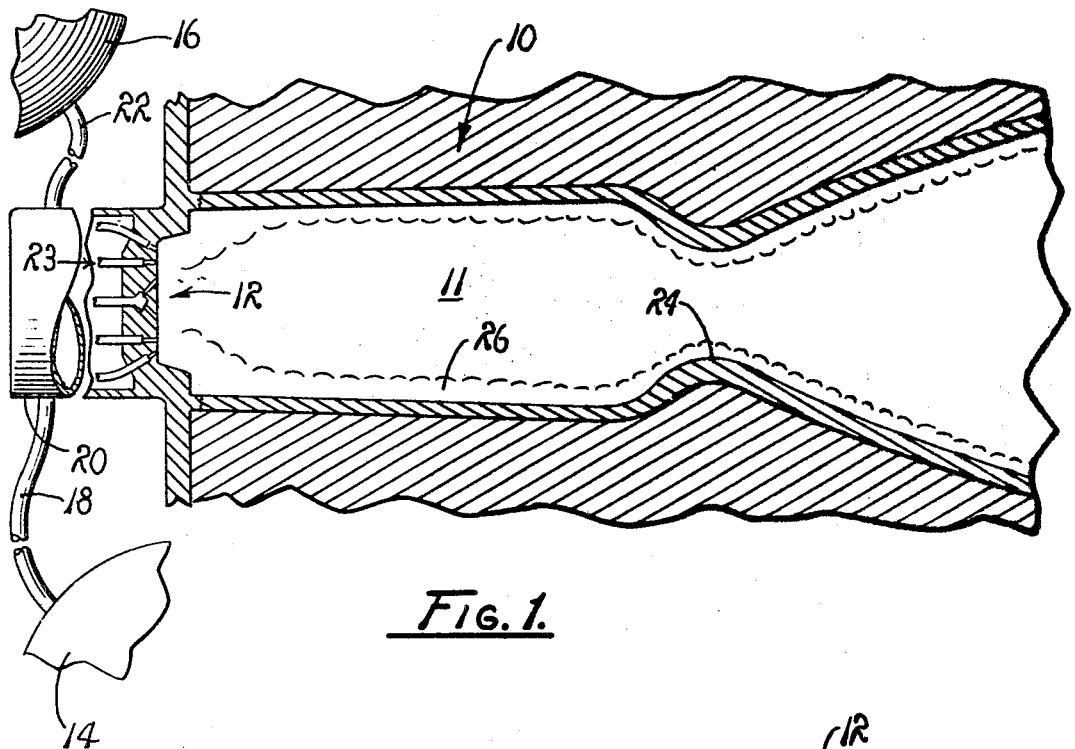
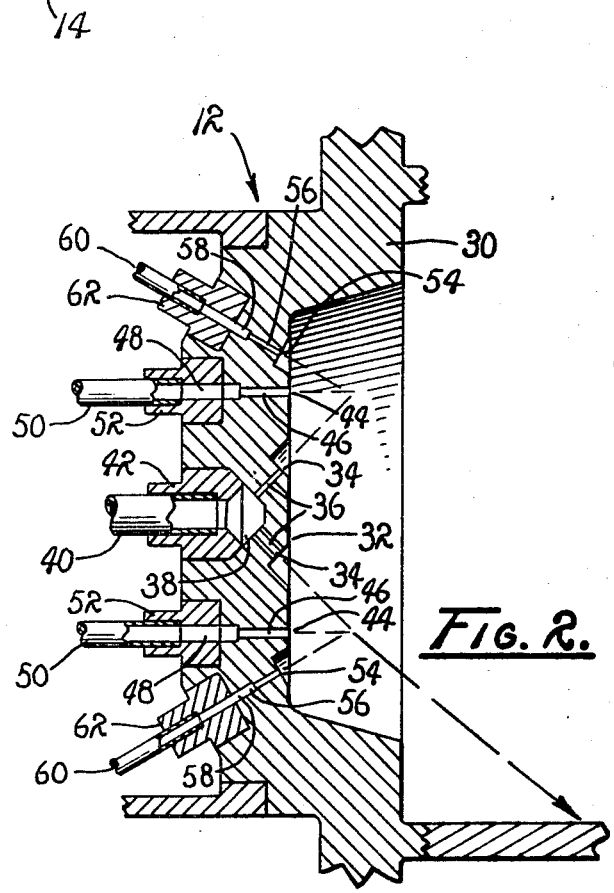
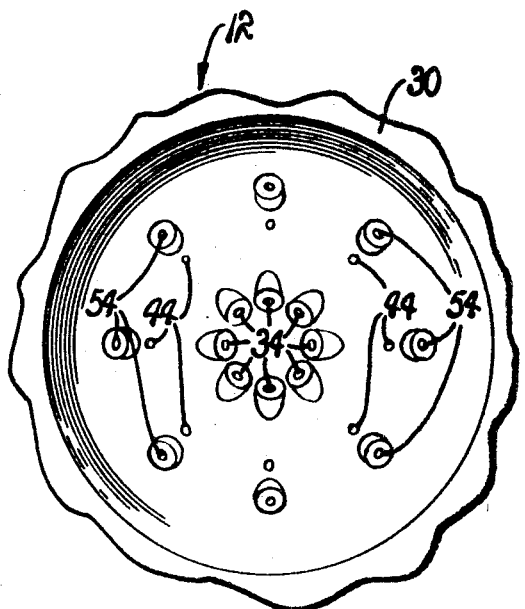
Fig. 1.
Fig. 2.
Fig. 3.
MARTIN G. DREXHAGE
INVENTOR
ATTORNEYS

MARTIN G. DREXHAGE
INVENTOR

ATTORNEYS

MARTIN G. DREXHAGE
INVENTOR

Monte F. Mott
ATTORNEYS

3,603,092

INJECTION HEAD FOR DELIVERING LIQUID FUEL AND OXIDIZERS

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2,457).

BACKGROUND OF THE INVENTION

1. Field of the invention

This invention relates to liquid propellant reaction engines and more particularly to an injection head for delivering liquid fuel and liquid oxidizer to the thrust chamber of a reaction engine.

2. Description of the Prior Art

The field is replete with injection heads for injecting liquid fuel and oxidizers to the thrust chambers of reaction engines. Normally, the fuel and the oxidizer simultaneously are injected from separate orifices into a thrust chamber in a manner such that the fuel and the oxidizer are brought into physical contact and mixed for achieving desired fuel oxidation, frequently called combustion, within the thrust chamber. Since the rate of combustion is the rate at which the fuel is oxidized, it is apparent that engine efficiency is somewhat dependent upon achieving total oxidation of the fuel. To achieve optimum combustion, it therefore is necessary to provide a suitable quantity of oxidizer thoroughly mixed with the fuel. In order to achieve the desired mixing, the fuel and oxidizer often are atomized and mixed during injection. It is a common practice to deliver the oxidizer and fuel from separate orifices at preselected velocities and in appropriate proportions.

One of the presently employed techniques is to direct a stream of fuel into a stream of oxidizer. However, to achieve optimum performance, through optimum mixture ratios, the diameters of the fuel and oxidizer orifices are such as to produce an uneven distribution of the oxidizer throughout the thrust chamber when optimum stream velocities are employed. In particular, the orifice provided for the oxidizer stream is larger than the orifice employed in delivering the smaller impinging stream of fuel and those portions of the larger oxidizer stream, which do not experience direct momentum exchange with the smaller impinging fuel streams, are deflected towards the wall of the thrust chamber to there establish an oxidizer-rich region. This results in an establishment of a region of relatively high local heat extending along the wall of the thrust chamber. Since, for reasons fully appreciated, it is highly desirable to maintain the temperature of the walls of a thrust chamber substantially below that experienced inwardly therefrom, the presence of an oxidizer-rich region along the wall of the thrust chamber is deemed to be highly undesirable.

OBJECTS AND SUMMARY OF THE INVENTION

This invention overcomes the aforementioned difficulties through the use of a novel arrangement of fuel and oxidizer orifices which serve to provide a fuel-rich region along the walls of a thrust chamber so as to perform a cooling function for the walls.

Accordingly, an object of the instant invention is to provide a simplified injection head for simultaneously delivering a liquid fuel and a liquid oxidizer to a thrust chamber of a liquid-fuel reaction engine in a manner such as to establish a fuel-rich region along the internal surfaces of the walls of the thrust chamber thereby to achieve a cooling effect.

Another object is to provide an improved injection head for a thrust chamber of a reaction engine.

Another object is to provide an improved injection head for a thrust chamber which optimizes momentum exchange and eliminates oxidizer pinching as the fuel and oxidizer are delivered to the thrust chamber.

Another object is to provide an injection head for a thrust chamber having orifices of varying diameters so arranged that predetermined deflection of the streams of fuel and oxidizer is achieved in a manner such that a fuel-rich region is provided along the surfaces of the chamber walls thereby to establish a cooler burning region adjacent to the walls.

Another object is to provide an injector for a thrust chamber of a reaction engine adapted to achieve optimized combustion efficiency and heat rejection by establishing mixture ratio segregation.

BRIEF DESCRIPTION OF THE DRAWINGS

FIG. 1 is a cross section of a typical liquid-fuel reaction engine employing the injection head embodying the principles of the present invention.

FIG. 2 is an enlarged section of a first form of the injection head illustrated in FIG. 1, depicting one orifice arrangement which may be employed for injecting fuel and oxidizer from the injection head.

FIG. 3 is an end view of the injection head illustrated in FIG. 1.

GENERAL DESCRIPTION OF THE PREFERRED EMBODIMENTS

Figure 4:
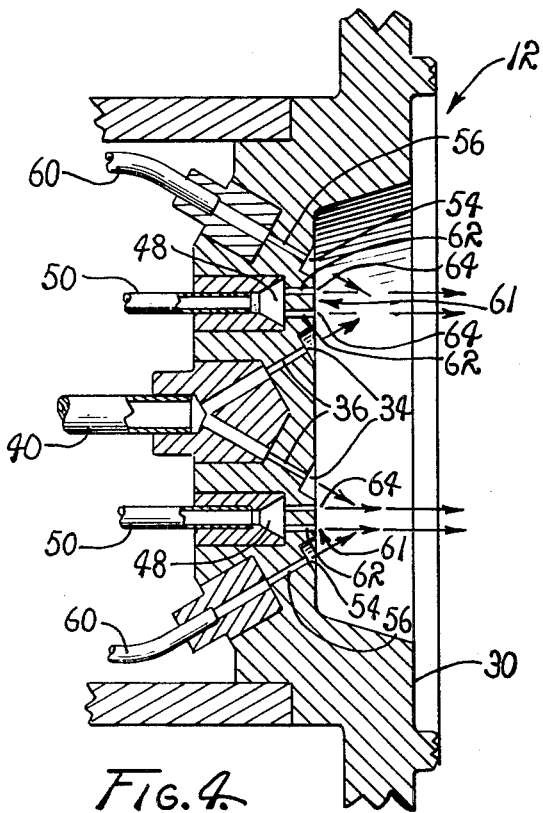
FIG. 4 is a cross section of a second form of the injection head illustrated in FIG. 1, depicting a second orifice arrangement employed in delivering fuel and oxidizer to the thrust chamber of FIG. 1.

Turning now to FIG. 1, there is illustrated a reaction engine 10 having mounted therein an injection head 12 which embodies the principles of the present invention.

As used herein, the term "reaction engine" includes any engine which develops thrust by expelling therefrom a stream of heated gases. As such, it is intended that the term "reaction engine" be applied to various types of engines, including that more commonly referred to as liquid-fuel rocket engines, ram jet engines and the like.

Reaction engines, particularly liquid rocket engines, include suitable means for delivering liquid fuel as well as liquid oxidizers thereto. Since the fuel and oxidizers are normally delivered from a pressurized source, it is to be understood that any convenient source may be employed for delivering the fuel and oxidizer to the injection head 12 of the present invention.

However, as illustrated, a source of liquid fuel 14 and a source of liquid oxidizer 16 are connected to the injection head 12 through a pressurized system including conveniently coupled pressure lines 18 and a convenient coupling 20.

Since the particular source of fuel and oxidizer, as well as the lines and coupling employed in supplying the injection head of the instant invention is a matter of convenience only, a detailed description thereof is omitted in the interest of brevity. It should be understood, however, that the fuel and oxidizers are delivered to the injection head 12 to be discharged therefrom as a fluid into the thrust chamber 11. In order to convey the fuel from the source 14, a convenient pressure line 18 is extended between the source 14 and coupling 20 while a pressure line 22 is employed in a similar manner to deliver oxidizer from the source 16 to the coupling 20.

The coupling 20, i effect, serves as a throttable manifold valve for delivering both the fuel and oxidizer and may be of any convenient design. Since the coupling 20 forms no part of the instant invention, ad detailed description thereof is omitted. However, in practice, the coupling 20 includes a fuel manifold and an oxidizer manifold each serving to direct fuel and oxidizer to various lines, generally designated 23, employed in delivering the fuel and oxidizer to the combustion chamber.

As shown in FIG. 1, the injection head 12 is mounted adjacent to one end of the thrust chamber 11 in coaxial alignment with the chamber's throat 24. Therefore, it is to be understood that as the fuel and the oxidizer are injected into the thrust chamber 11, they are atomized and mixed ultimately to be discharged through the throat 24, as products of fuel combustion for thus effecting a propulsion of the engine 10.

It is a well recognized principle that the momentum of a moving body can be defined as a product of its mass and velocity and that the momentum is in the direction of its velocity. Hence, as two streams of fluid are delivered at different volumetric rates to a point of intersection, a momentum exchange between portions of the stream occurs so that a common direction and velocity are imparted to the portions of the stream caused to undergo momentum exchange. However, when the momentum exchange is incomplete, deflection of portions of the streams frequently occurs. Consequently, when an outwardly directed stream of fuel delivered from the fuel injection orifice intersects a stream of oxidizer flowing at a greater volumetric flow rate and at a lower velocity along a path extending from the oxidizer injection port parallel the longitudinal axis of the combustion chamber, outward deflection of the oxidizer toward the chamber wall often occurs.

Thus, in order to avoid an establishment of an oxidizer rich region in the vicinity of the wall of the combustion chamber, the injection head of the instant invention is provided with an annular array of "sets" of delivery ports or orifices which function as "unbalanced triplets." The orifices or ports of the unbalanced triplets are so related that an inwardly directed stream of fuel is delivered to impinge on a stream of oxidizer being delivered to the combustion chamber, along a path paralleling the longitudinal axis of the chamber, at a flow rate and velocity sufficient to impede deflection of the oxidizer toward the wall of the combustion chamber. Thus a relatively cool, fuel rich region is established along the wall of the combustion chamber, even though an outwardly directed stream is caused to impinge on the stream of oxidizer.

Each of the hereinafter described embodiments of the principles of the present invention, as shown in FIGS. 2 through 6, is similarly employed to develop a cooler-burning region 26 extending along the wall of the thrust chamber 11, whereby the regions adjacent to the wall are substantially cooler than the regions nearer the longitudinal axis of the chamber.

DESCRIPTION OF THE FIRST PREFERRED EMBODIMENT

Turning now to FIG. 2, therein is illustrated the injection head 12 which includes a transverse plate 30 defining one end of the thrust chamber 11. The plate 30 is generally circular configuration and includes a recessed central portion or concavity 32 arranged in coaxial alignment with the oppositely disposed chamber throat 24.

About the axis of the plate 30 there is a plurality of annularly arranged orifices 34 employed to deliver streams of fuel along diverging paths extending into the thrust chamber 11. As shown, each of the orifices 34 is established at one end of a fuel injection conduit 36, the longitudinal axis of which intersects the longitudinal axis of the thrust chamber therewith to define an included angle of approximately 45°.

Each of the injection conduits is in communication with a pressurized fuel injection chamber 38 formed as a recess within the center portion of the reversed surface of the plate 30. Each chamber 38 is supplied by a pressurized fuel feed line 40 communicating with the chamber 38 and secured therein by a conveniently secured fitting 42. Therefore, it is to be understood that as fuel, in a fluid state, is directed through the input line 40, from the coupling 20, it is delivered to the pressurized chamber 38 and injected through the conduits 36 and the orifices 34 along diverging paths into the thrust chamber 11.

In radial alignment with each of the orifices 34, there is an oxidizer orifice 44. This orifice serves to deliver a stream of oxidizer to be mixed with the stream of fuel for achieving a combustion of the fuel within the chamber 11. Each of the oxidizer orifices is defined by the innermost end of an oxidizer injection conduit 46, which conduit extends between the thrust chamber 11 and a pressurized oxidizer injection chamber 48, each of which is formed as a recess within the reversed surface of the plate 30.

Figure 8:
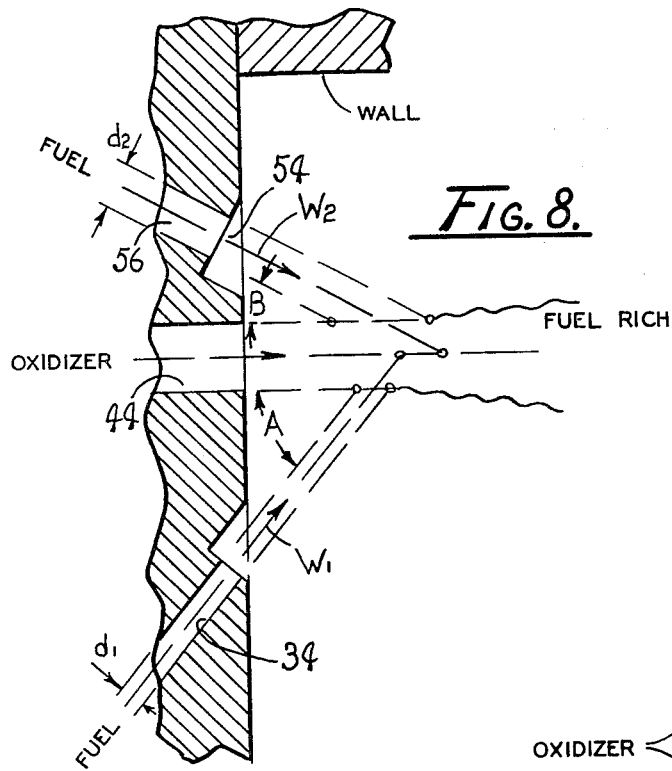
FIG. 8 is a fragmented diagrammatic view, on an enlarged scale, of a portion of the injection head shown in FIG. 2.

The longitudinal axis of each of the conduits 46 extends parallel with the longitudinal axis of the thrust chamber 11 so that a plurality of parallel streams of pressurized oxidizer are simultaneously injected into the thrust chamber 11, to be intercepted by the stream of fuel as it is injected in a plurality of diverging streams from orifices 34 to impinge at a selected angle A, FIG. 8. In order to deliver the fluid oxidizer to the chambers 48, a pressure line 50 is extended from each of the chambers to the coupling 20. It is to be understood that convenient fittings 52 are employed in coupling the lines 50 with the chamber 48 in any suitable manner.

Each of the oxidizer injection orifices 44, as illustrated in FIG. 8, is provided with a diameter significantly larger than the diameter adjacent fuel injection orifices 34, designated $d_1$, in order to accommodate the generally larger volumetric oxidizer flow at reasonably low velocity and pressure drop. The fuel velocity generally is higher than the oxidizer velocity to balance momentum ratios and momentum vectors in a desired manner and particularly to provide energy for atomization. As a consequence of the difference in oxidizer and fuel stream diameters and velocities the momentum exchange between the two streams is generally incomplete. Hence, portions of the oxidizer stream are deflected toward the wall of the combustion chamber as the stream of fuel delivered from the injection orifices 34 impinge on the stream of oxidizer delivered from the injection orifices 44.

In order to assure that the deflected portions of the stream of oxidizer do not establish an oxidizer-rich region along the wall of the thrust chamber, for thereby developing along the wall a region of elevated temperatures, the plate 30 is provided with a plurality of peripheral orifices 54, aligned in radial alignment with the orifices 44 and 34 to establish a "set" of orifices including two fuel injection orifices and an oxidizer injection orifice. Each of the peripheral orifices defines one end of fuel injection conduit 56 and serves to deliver a stream of fuel along a path extending from the orifices to impinge, at an included angle B, less than angle A, FIG. 8, on the streams of the fuel and oxidizer operatively being delivered from the orifices 34 and 44, respectively.

Each of the fuel conduits 56 is extended from the associated orifice 54 to a pressurized chamber 58 which is supplied with fuel by a pressure line 60 also extending to the coupling 20. The chamber 58 also is formed as a recess in the reversed surface of the plate 30, while the line 60 operatively is coupled by any convenient means including fittings 62, seated within recesses also formed within the plate 30 adjacent the chamber 58.

The diameter of the peripheral conduits 56 and orifices 54, designated $d_2$, FIG. 8, is greater than diameter $d_1$ of the conduits 36 and orifices 34. Thus it is possible to deliver a stream of fuel from the orifices 34 at a given volumetric flow rate, designated $W_1$, and from the orifices 54 at a flow rate, designated $W_2$, substantially greater than the given flow rate $W_1$. Since the pressure lines 40 and 60 are coupled to a common fuel source, through the coupling 20, they are similarly pressurized. Therefore, the portions of the streams delivered by the orifices 34 engage inner portions of the streams of oxidizer delivered from the orifices 44, whereas the portions of the stream of fuel delivered from the orifices 54 envelope outer portions of said oxidizer stream. Thus through the unbalance in fuel flow rate on opposed sides of the oxidizer stream and the slight unsymmetry in the impingement geometry generated by the different angularity of the fuel streams, FIGS. 2 and 8, an hydraulic flow pattern results from the impingement point which is fuel-rich on the outboard side and oxidizer-rich on the inboard side of the stream. Consequently, a fuel-rich mixture is extended along the wall surfaces of the thrust chamber 11, indicated by the directional arrow, FIG. 2, resulting in reduction of combustion gas temperature near the wall.

Since a fuel-rich barrier region is formed along the wall surfaces, the fuel cannot be completely oxidized. The resulting temperature for the fuel-rich region is substantially lower than the temperatures encountered in the regions where mixing of the oxidizer with the fuel is more complete. For example, a temperature differential of several hundred degrees has been detected between various regions within the thrust chamber for low-thrust variety engines.

It is readily apparent that for various types of reaction engines the velocity at which the fuel and the oxidizer must be delivered to the thrust chamber, for satisfying given performance requirements, may vary significantly. Therefore it is to be understood that the included angle defined by the axis of the paths of fuel and oxidizer may be varied as found desirable to achieve the desired momentum exchange between the portions of the streams of fuel and oxidizers. Furthermore, the velocity at which the fuel and the oxidizer are delivered to the thrust chamber also will vary, depending upon the operative environment and intended purposes of the reaction engine.

DESCRIPTION OF THE SECOND PREFERRED EMBODIMENT

Figure 5:
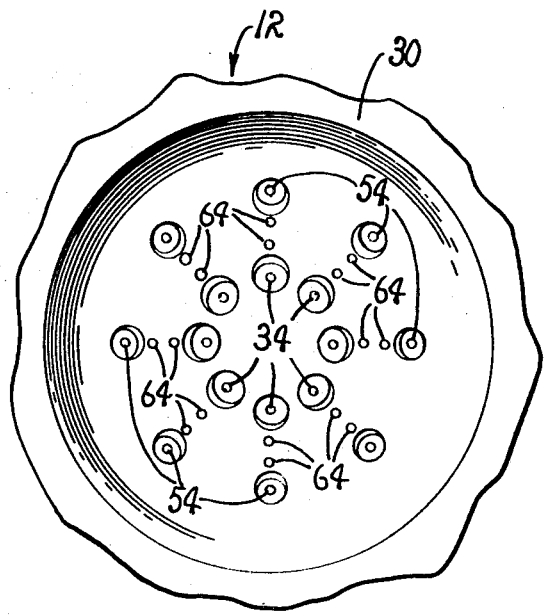
FIG. 5 is an end view of the injection head illustrated in FIG. 4.
Figure 9:
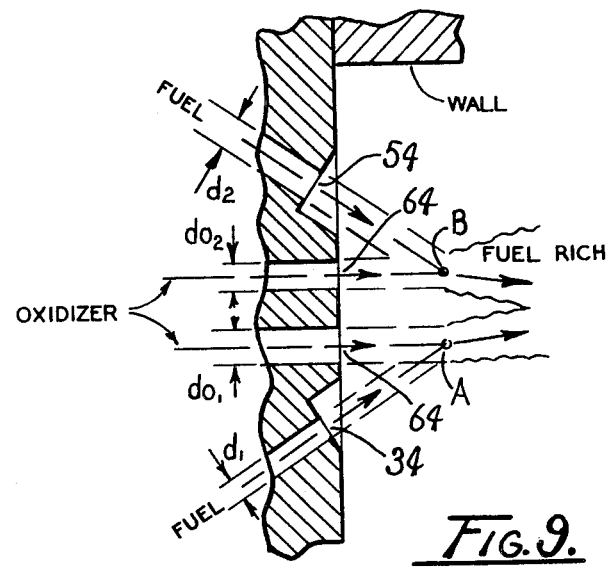
FIG. 9 is a fragmented, diagrammatic view, on an enlarged scale, of a portion of the injection head shown in FIG. 4.

While the injection head illustrated in FIGS. 2 and 3 functions quite satisfactorily, improved performance can be achieved by employing an injection head of the type specifically illustrated in FIGS. 4, 5 and 9.

As shown in FIGS. 4, 5 and 9, the injection head is quite similar to the injection head illustrated in FIGS. 2, 3 and 8 and is employed in a similar manner to develop a fuel-rich cooler-burning barrier region close to the wall of the thrust chamber 11. However, in order to achieve optimized momentum exchange and to avoid "oxidizer pinching" when the streams of fuel are caused to converge on the stream of oxidizer, bifurcated oxidizer ports 61 are provided in lieu of the single-opening orifices 44.

Each of the oxidizer injection ports 61 operatively is provided with a pair of parallel oxidizer ejection conduits 62 terminating to establish a pair of adjacent orifices 64 for injecting two parallel oxidizer stream components. The inboard oxidizer stream component is intercepted by the fuel stream emerging from the radial fuel orifice 34 and similarly the outboard oxidizer stream component is intercepted by the fuel stream ejected from the peripheral fuel orifices 54. Characteristically the diameters, designated $d_{o1}$ and $d_{o2}$ of the two adjacent oxidizer orifices 64 are of different magnitude such that the two oxidizer stream components transport unequal volumetric flow rates, as illustrated in FIG. 9. Likewise the fuel orifices 34 and 56 are characteristically of different diameter and being pressurized from the same source transport different volumetric fuel flow rates, as hereinbefore discussed. It is easily recognized that in this manner the inboard half of the entire oxidizer-fuel injection element can be operated in an oxidizer-rich condition and the outboard half of said element in a fuel-rich condition. Consequently a fuel-rich, cooler-burning barrier region close to the wall is developed.

In practice, another advantage is derived from this arrangement. As a result of the division of the single oxidizer stream utilized in the first embodiment into two individual stream components, the relative oxidizer and fuel stream diameters can be matched to avoid oxidizer stream pinching effects common in conventional triplet elements.

DESCRIPTION OF THE THIRD PREFERRED EMBODIMENT

Figure 6:
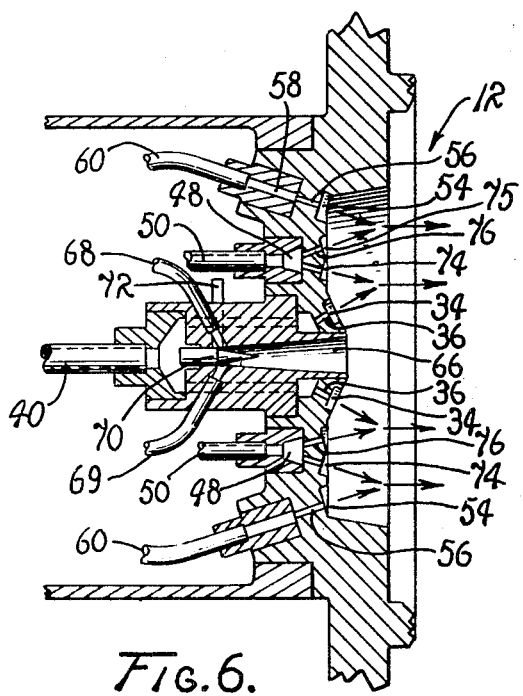
FIG. 6 is a cross section of a third form of the injection head embodying the principles of the present invention and employed in delivering fuel and oxidizer to the thrust chamber illustrated in FIG. 1.
Figure 7:
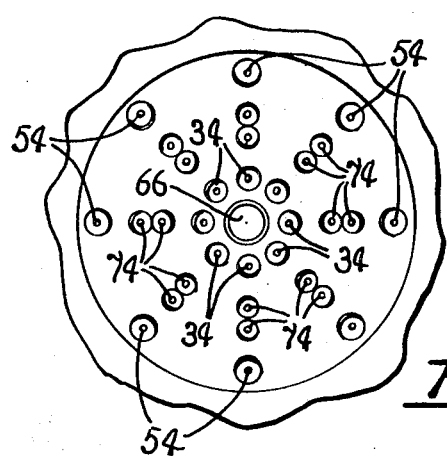
FIG. 7 is an end view of the injection head of FIG. 6.
Figure 10:
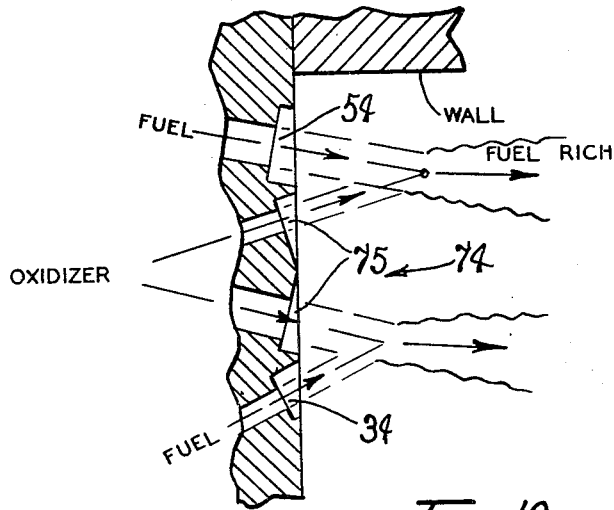
FIG. 10 is a fragmented, diagrammatic view, on an enlarged scale, of a portion of the injection head shown in FIG. 7.

While the injection heads illustrated in FIGS. 2 through 5, 8 and 9 function quite satisfactorily for fulfilling certain requirements, a head of the type illustrated in FIGS. 6, 7 and 10 includes a preignitor and spike suppressor for achieving combustion stability with very few oscillations on firing, while also establishing a cooler-burning region adjacent to the walls of the thrust chamber 11 with increased efficiency.

Referring particularly to FIGS. 6, 7 and 10, it will be noted that the injection head 12, in many respects, is quite similar to the injection head heretofore described and particularly as shown in FIGS. 4, 5 and 9. However, for the head illustrated in FIGS. 6, 7 and 10, there is provided at the center of the plate 30 a concentrically arranged discharge port 66, formed as a frustoconical opening communicating with the thrust chamber.

The port 66 is provided with an oxidizer injection conduit 68 and a fuel injection conduit 69, which simultaneously serve to deliver fuel and oxidizer so that the fuel and oxidizer simultaneously are mixed and discharged from the conical port 66 to the chamber 11, whereby the chamber becomes prepressurized prior to engine startup sufficiently for achieving stability on firing. Subsequent to engine ignition, it is intended that a mixture of fuel and oxidizer be supplied by the fuel and oxidizer lines 40, 50 and 60 in a manner similar to that hereinbefore described with respect to the injection heads of FIGS. 2 through 5.

As a matter of convenience only, it is practical to provide a convenient spike-shaped pintle 70 seated within the port 66 so that mixtures of oxidizer and fuel will not accumulate in the port 66. In practice, the pintle is fixed in place. However, should it become desirable to do so, the pintle can be displaced. While the pintle 70 forms no specific part of the instant invention, it may be provided with a peripheral surface having screw threads formed thereon which serve to advance and retract the pintle upon being rotated through the drive-link 72. Since the manner in which the pintle is advanced and retracted is a matter of convenience only, a detailed description thereof is omitted in the interest of brevity.

In order to deliver oxidizer from the oxidizer lines 50 for supporting combustion of the fuel delivered from the ports 34 and 54, oxidizer ports 74 are provided and aligned in radial alignment relative to the ports 34 and 54 in a manner similar to that hereinbefore described with respect to the injection heads 12 of FIGS. 2 through 5, 8 and 9.

In order to enhance the desired cooling effect achieved by the fuel-rich ratio of fuel oxidizer, each of the oxidizer ports 74 is bifurcated port, similar to the ports 61, as illustrated in FIGS. 4, 5 and 9. However, each of the ports 74 includes a pair of adjacent oxidizer discharge orifices 75 communicating with the pressurized chamber 48 through conduits 76, the longitudinal axes of which intersect at a point within the pressure chamber 48. Therefore, it will be appreciated that as the oxidizer is delivered into the injection head 12, by the pressure line 50, each of the oxidizer discharge ports 74 serves to deliver the oxidizer to the thrust chamber in a pair of diverging stream components, each of which is separately intercepted by a stream of fuel as the fuel is injected at the ports 34 and 54.

As a practical matter, the fuel line 60, through orifice 54, delivers a greater volumetric flow than is delivered from the orifice 34, due to the relative sizes thereof. Consequently, an outboard fuel-rich condition is achieved, while an inboard oxidizer condition is achieved.

With the arrangement illustrated in FIGS. 6, 7 and 10, it is entirely feasible to dictate and segregate mixture control so that a controlled fuel-rich region is established adjacent to the wall of a thrust chamber 11 in a manner quite similar to that hereinbefore described with respect to the embodiments illustrated in FIGS. 2 through 5, while the center portion of the chamber is provided with an optimum fuel oxidizer mixture of oxidizer and fuel to achieve maximum levels of thrust.

It will be appreciated that in employing the ports 74 to deliver streams of oxidizer, as diverging stream components, the velocity differential developed between the streams of oxidizer and the impinging streams of fuel may be varied as required for achieving the desired deflection of the streams of fuel being delivered by the peripheral orifices 54, while yet maintaining a desired optimum performance mixture ratio for the fuel and oxidizer.

OPERATION

It believed belived that in view of the foregoing description, the operation of the device will be readily understood and it will be briefly reviewed at this point.

While three forms of the head 12 embodying the principles of the instant invention have hereinbefore been set forth, it is to be understood that various combinations of the orifices may be employed as desired for any given environment or purpose. However, it is of particular importance to understand that in all instances fuel delivered from the peripheral ports 54 is delivered at selected angles to impinge on the stream of oxidizer in a manner such that a fuel-rich, cooler-burning region is established along the wall of the thrust chamber 11. This is in contrast to known "triplets" wherein a stream of oxidizer is intercepted by converging streams of fuel injected at common flow rates through ports of a common diameter and directed in common converging angles for producing a symmetrical distribution of oxidizer fuel mixtures.

Therefore, in all embodiments of the instant invention, the fuel is delivered in converging streams, under pressure, through the axial ports 34 and 54 of the heads 12. As the fuel is delivered from the orifices 34 it is caused to impinge upon and intercept the streams of oxidizer being delivered by the orifices 54. The streams of fuel and oxidizer are so deflected as to develop a fuel-rich burning region along the surfaces of the thrust chamber 11. Since the mixture is fuel-rich, oxidation of the delivered fuel is rendered incomplete, the resulting temperatures developed in this region are substantially less than that achieved elsewhere throughout the engine as optimized mixing of the fuel and oxidizer occurs.

Therefore, in view of the foregoing, it should be readily apparent that the present invention provides a convenient injection head for a thrust chamber of a reaction engine of the type employing fluid fuels and fluid oxidizers for achieving a cooler-burning barrier region adjacent the wall of the thrust chamber, while affording optimized mixing of the fluid fuel and oxidizer inwardly of the cooler region so that a temperature differential is established between the regions adjacent to the walls of the thrust chamber and the longitudinal axis of the engine.

Although the invention has been herein shown and described in what are conceived to be the most practical and preferred methods and apparatus, it is recognized that departures may be made therefrom within the scope of the invention, which is not to be limited to the details disclosed herein but is to be accorded the full scope of the claims so as to embrace any and all equivalent methods and apparatus.

What is claimed is:

1. An injection head for a thrust chamber of a reaction engine of the type embodying a fluid fuel and a fluid oxidizer comprising:
   A. a plate defining a portion of a transverse end wall for an associated thrust chamber;
   B. a first annular array of fuel orifices concentrically related to the central portion of said plate, each of said fuel orifices having a given diameter and arranged to deliver an inner stream of fuel into said chamber at a first flow rate and a given velocity along an outwardly directed path;
   C. an annular array of oxidizer delivery ports circumscribing said first annular array of fuel orifices, each of said oxidizer ports being radially aligned with one orifice of the first annular array of fuel orifices for delivering a pressurized stream of oxidizer at a velocity less than said given velocity to a point of intersection with the inner stream of fuel delivered by said one orifice; and
   D. a second annular array of fuel orifices circumscribing said annular array of oxidizer delivery ports, each orifice of said second annular array of fuel orifices being radially aligned with one of said oxidizer ports and of a second diameter substantially greater than said given diameter for delivering a stream of fuel along an inwardly directed path, at a second flow rate greater than said first flow rate, to a point of intersection with a stream of oxidizer delivered by said one port of said annular array of oxidizer delivery ports, and at a velocity equal to said given velocity.

2. The injection head of claim 1 wherein each of the oxidizer delivery ports is a bifurcated port including a pair of adjacent orifices each of which serves to deliver a component of a stream of oxidizer.

3. The injection head according to claim 2 wherein the adjacent orifices of each delivery port deliver stream components along substantially parallel paths.

4. The injection head according to claim 2 wherein the adjacent orifices of each of said oxidizer delivery ports deliver stream components along substantially diverging paths.